United States Patent [19]

Rowland-Hill

[11] 3,995,645

[45] Dec. 7, 1976

[54] AXIAL FLOW COMBINE HAVING CONCAVE RELIEF

[75] Inventor: Edward W. Rowland-Hill, Lancaster, Pa.

[73] Assignee: Sperry Rand Corporation, New Holland, Pa.

[22] Filed: Dec. 16, 1975

[21] Appl. No.: 641,220

[52] U.S. Cl. .............................................. 130/27 T
[51] Int. Cl.² ........................................ A01F 12/20
[58] Field of Search ............. 130/27 T, 27 J, 27 R; 56/14.6

[56] References Cited

UNITED STATES PATENTS 3,742,686   7/1973   Rowland-Hill .................. 130/27 T Primary Examiner—Russell R. Kinsey
Attorney, Agent, or Firm—C. Hercus Just; Frank A. Seemar; John R. Flanagan

[57] ABSTRACT

A combine of the axial flow type having a coacting rotor and concave assembly having a threshing region therebetween, said concave being provided with a relief section at the forward end of said concave to accommodate abnormal masses of crop material operable to thin out said masses prior to passing rearwardly into said threshing region.

5 Claims, 3 Drawing Figures

AXIAL FLOW COMBINE HAVING CONCAVE RELIEF

CROSS-REFERENCE TO RELATED APPLICATIONS

This application is pertinent to co-pending application, Ser. No. 558,507, now U.S. Pat. No. 3,957,058 filed Mar. 14, 1975 in the name of John J. Komancheck, entitled Detachable Mount for Concave Axial Flow Combine, and Ser. No. 632,547, filed Nov. 17, 1975, in the name of Edward W. Roland-Hill and entitled Axial Flow Combine Having Conical Auger.

BACKGROUND OF THE INVENTION

In the use of axial flow type combines, in which rotor means extend substanitally longitudinally from an inlet end of a threshing compartment for coaction with a concave to effect threshing of crop materials of different kinds, it has been found to be effective to provide auger means on the forward ends of said rotors for effecting desirable delivery of the crop material from the upper end of an elevator into the inlet end of said threshing compartment. However, it also has been found that particularly in regard to certain crop conditions, combines that have an auger type infeed tend to bunch or rope the material together as it is moved from said elevator axially into said threshing compartment. When harvesting crops that produce so called tough threshing conditions, the concave and rasp bars on the rotor must be set at an extremely close setting and this situation, combined with material that is bunched when fed to said threshing compartment causes a thumping and reduced feeding capacity in the combine, as well as increased wear of the rasp bars and a certain amount of damage to kernels or grains which are threshed under such close setting conditions.

One typical example of a type of combine which has become very popular in recent years comprises the subject matter of U.S. Pat. No. 3,848,609, dated Nov. 19, 1974, to Mortier et al. In said combine, there is a conventional type of header at the forward end which includes cutter means and consolidating auger means which deliver a steady stream of said material to an elevator which moves the crop material upward and rearward to the auger which then forceably delivers the material to the inlet end of the threshing compartment, which exists between the rotor which has rasp bars thereon, and a concave which is generally along the lower portion of the rotor. In the combine specifically illustrated in said patent, a pair of rotors and cooperating concaves are provided but is to be understood that certain types of combines also have only a single rotor and concave.

When bunching of the crop material or the formation of a rope-like consistency thereof occurs in the delivery of the material to the auger and threshing compartment of the combines referred to above, the threshing components of the combine are subjected to abnormal wear and, in addition, substantial power is required to be provided in the combine to operate it for purposes of enabling the same to cope with such abnormal conditions of bunched material as introduced to the threshing compartment, as distinguished from a relatively even or smooth flow of material being delivered to said threshing compartment. The thumping resulting from such condition not only is objectionable to the operator of the combine but, even more importantly, the threshing components of the combine either can be damaged or it is necessary to construct the same in a sufficiently heavy design to handle such abnormal conditions without damage and obviously this results in increased cost of manufacturing the combine.

SUMMARY OF THE INVENTION

It is a principal object of the present invention to provide in a combine of the axial flow type a relief region at the inlet end of the threshing compartment at which location the substantially axial direction of the incoming material is abruptly changed to moving in a radial direction, whereby the relief region permits the thinning of any bunched or rope-like material prior to the same being moved rearwardly into the threshing compartment where a closer setting between the concave and rasp bars of the rotor occurs and in which the material being threshed is primarily moved in a radial direction but also is moved axially by means of angular fins mounted in the housing which surround the upper portion of the rotor.

It is another object of the invention to provide said relief region in the infeed or inlet end of the combine by means of cutting away from the upper edges of the forward end portions of the bars of said combine a limited amount of the material to a uniform depth and a limited length in an axial direction, whereby a segmental curved relief area is provided at the inlet end of the threshing compartment between the forward end portions of the rasp bars on the rotor and the bars of said concave, which minimizes both wear upon the rasp bars and concaves and damage to the kernels and grains which are threshed especially at the inlet end of the threshing compartment.

It is a further object of the invention to shape said cutaway portions of the bars of said concave at the inner ends thereof so as to slope upwardly and rearwardly and thereby further facilitate the movement of the more or less thinned out material from said relief region to the more constricted threshing region rearwardly thereof between the rasp bars of the rotor and the normal upper edges of the concave bars.

Still another object of the invention is to provide a series of wire-like elements which extend transversely through and between the relieved forward end portions of the concave bars, said wire-like elements being spaced from each in a direction parallel to the axis of said rotor and thereby provide between said relieved portions of said concave bars and said wires a grid-like arrangement of spaces through which the shelled or threshed material passes and is received by suitable means from which the material passes to sifting mechanisms and other means by which chaff is removed from the shelled or threshed product.

Details of the foregoing objects and of the invention, as well as other objects thereof, are set forth in the following specifications and illustrated in the accompanying drawings comprising a part thereof.

DETAILED DESCRIPTION

Figure 1:
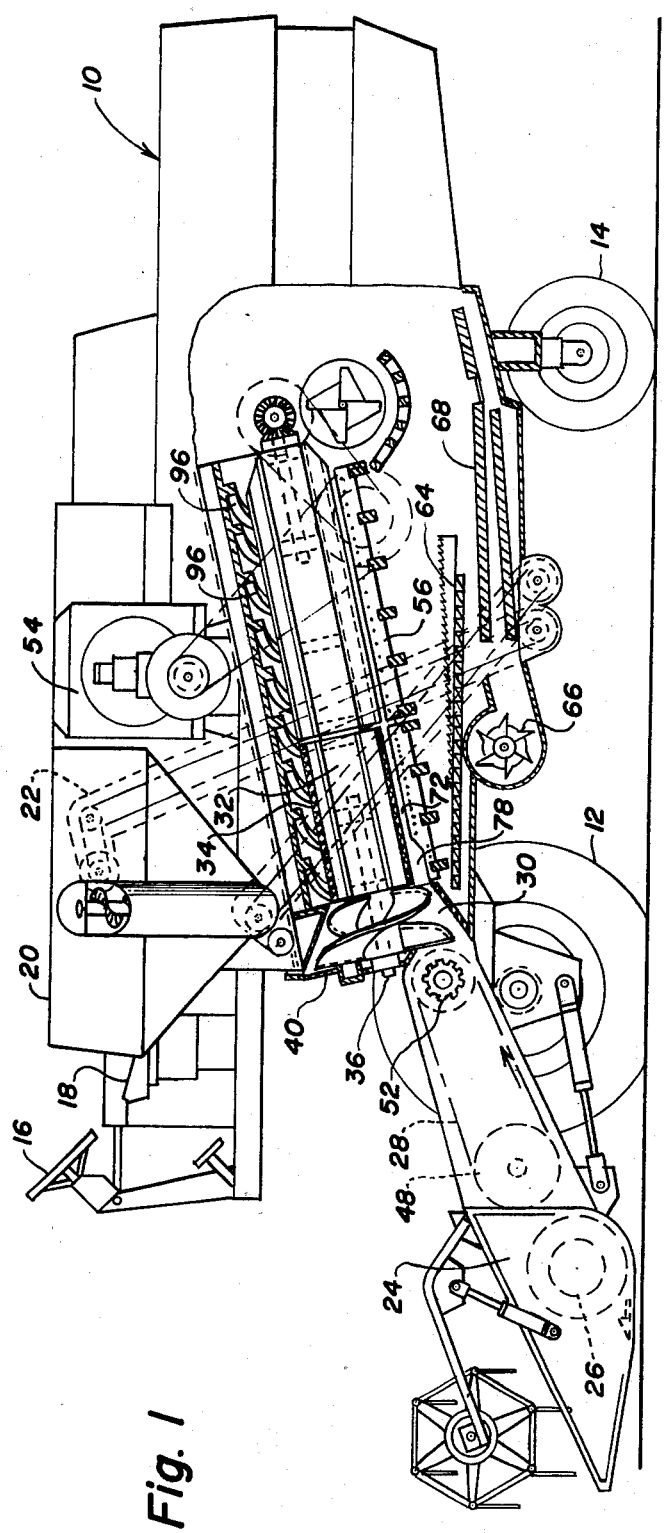
FIG. 1 is a side elevation of an exemplary axial flow type combine to which the present invention pertains and particularly the threshing components of said combine being illustrated in vertical sectional elevation to illustrate details thereof.

Referring to FIG. 1, the exemplary illustration of an axial flow type combine illustrated therein comprises an enclosing housing 10 which is mounted upon a main frame that is supported by a pair of forward, large traction wheels 12 which are spaced transversely apart, and a pair of smaller, steering wheels 14 which are positioned under the rearward portion of the housing 10 and are operated in steering manner by a forward steering wheel 16 and postioned to be operated by an operator seated upon the seat 18 at an elevated position above the forward portion of the combine. As illustrated, said combine also includes in said figure a grain bin 20 which receives grain from an elevator 22 which is shown in phantom in said figure.

Mounted forwardly of the combine is a typical header 24 which includes both cutter means and a consolidating auger 26 that delivers cut crop material to an elevator 28 which is positioned between the traction wheels 12 Said elevator is composed of conventional means comprising flexible belts which extend around drums or wheels and the transverse bars extend therebetween. Said belts move in the direction of the arrows, shown in FIG. 1. It will be seen from this that the feeding of cut crop material occurs in an undershot manner onto a feed ramp at the underside of the auger compartment 30.

Figure 2:
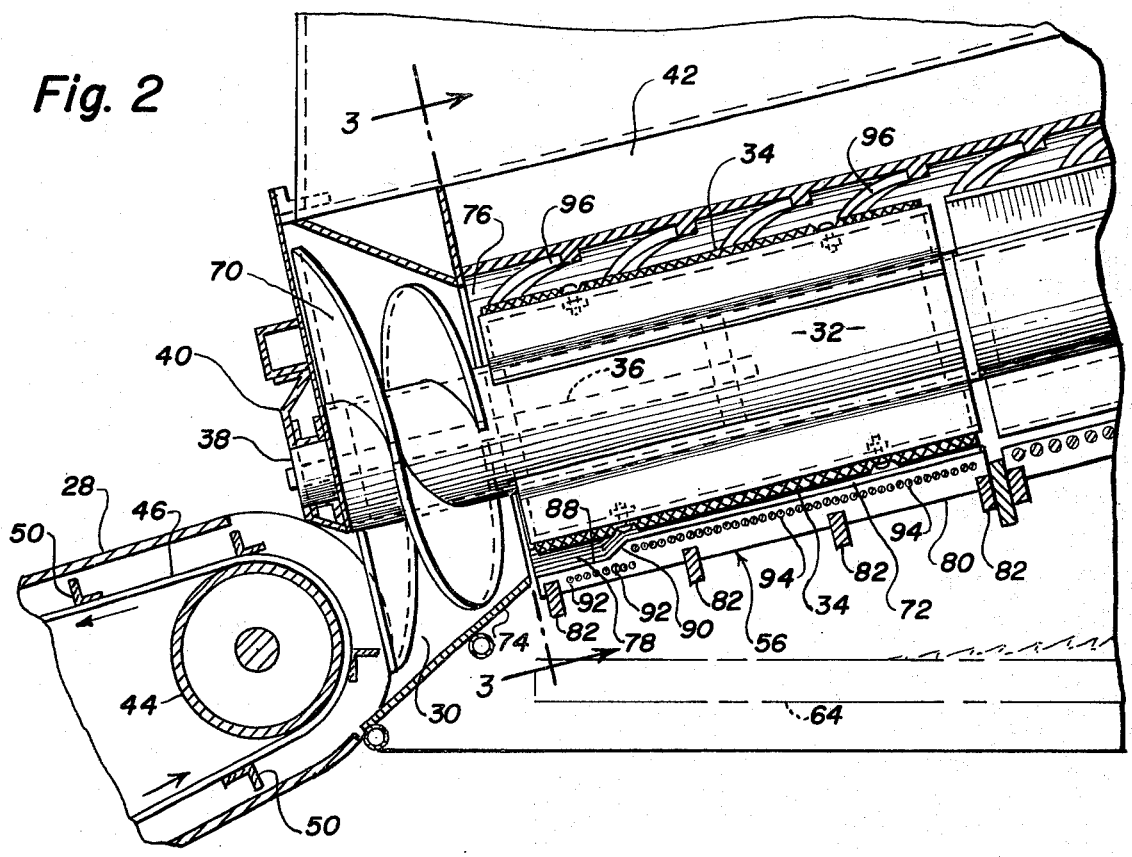
FIG. 2 is a fragmentary, further enlarged vertical sectional elevation of the forward end of the threshing compartment and illustrating the upper end of the elevator and auger means at the forward end of said threshing compartment.
Figure 3:
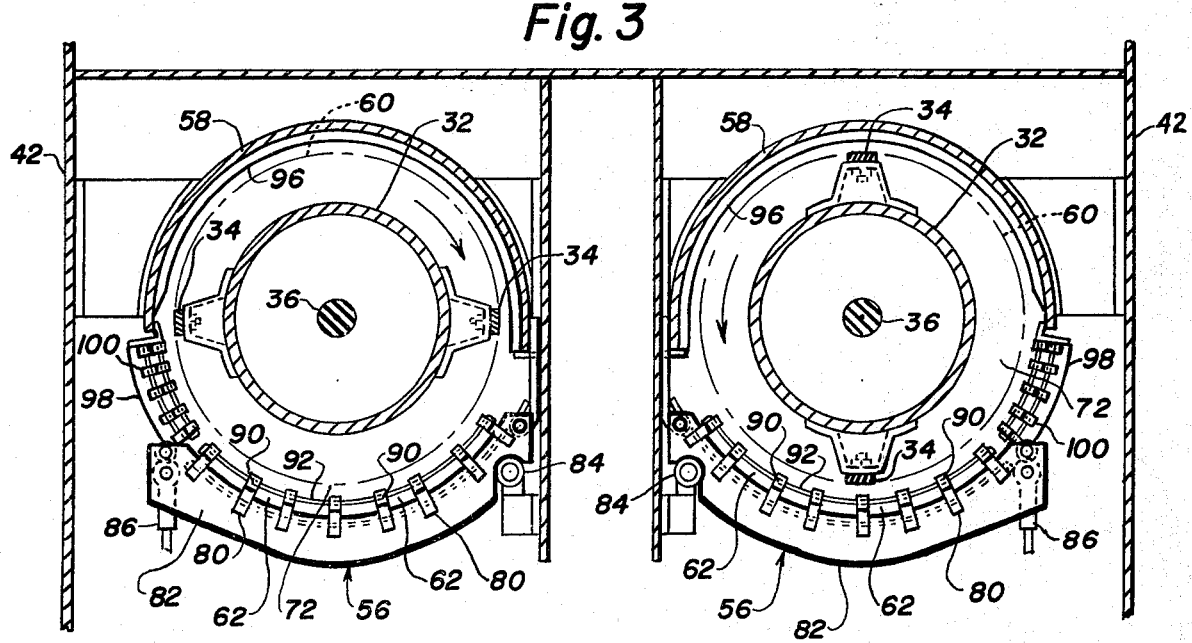
FIG. 3 is a fragmentary vertical elevation of the forward end of the threshing compartment as seen on the line 3—3 of FIG. 2.

The crop material is threshed between rotors 32, details of which are best shown in FIGS. 2 and 3, said rotors comprising a plurality of rasp bars 34 which extend longitudinally thereof and are supported suitably upon the outer surfaces of the generally tubular rotors 32. The forward ends of the rotors 32 have a shaft 36 extending inwardly into the forward ends of said rotors a predetermined distance and the same project forwardly through suitable bearings 38 mounted in the front plate 40 which extends transversely between opposite sides of the main frame 42, shown fragmentarily in FIGS. 2 and 3.

The upper end of the elevator 28 is shown fragmentarily in FIG. 2 and it will be seen that it comprises an uppermost drive cylinder 44 around which a plurality of endless chains or belts 46 extend for driving engagement of the same in the direction of the arrows shown in FIGS. 1 and 2, said chains also extending around a forward supporting cylinder 48, shown in phantom in FIG. 1. The belts or chains 46 support therebetween a plurality of cross bars 50 which are clearly shown in FIG. 2. The drive cylinder 44 for the elevator is actuated by a sprocket gear 50 which is connected by a sprocket chain, not shown, extending to and actuated by the main drive mechanism of the combine which comprises a diesel engine 54 of substantial power.

In the specifically illustrated combine shown in the present drawings, the rotors 32 and rasp bars 34 thereon respectively rotate in opposite rotary directions as indicated by the direction arrows shown in FIG. 3. In particular, the rasp bars coact with concaves 56 which preferably are mounted in the lower portion of the elongated threshing compartments respectively defined by elongated upper shields 58, shown in FIG. 3, and the concaves 56 which are curved and comprise the lower portions of said compartments. It also will be seen that said concaves extend circumferentially around the orbital paths of the rasp bars 34, which are shown in phantom in FIG. 3, for at least one quarter of the circumference of said path, as is clearly seen from FIG. 3. Said concaves have openings 62 therethrough which are formed by means described in detail hereinafter, for purposes of permitting the shelled or threashed crop material to pass therethrough, together with a certain amount of chaff and waster material. Said shelled or threshed material is received upon a grain pan 64, shown in FIG. 1, which is operated in conventional manner by driving mechanism, not shown, for purposes of permitting the grain or other crop material to be sifted therethrough for engagement by the lower end of the crop elevator 22. Chaff is blown by blower 66 toward the rear of the combine for discharge therefrom after being engaged by the chaffer sieves 68 which are shown in FIG. 1.

The rotors 32 also support at the forward ends thereof augers 70 which, as can be seen from FIG. 2, preferably are of the conical type for purposes of permitting more efficient feeding of crop material which is delivered in an undershot manner by the upper end of the elevator 28 to the threshing compartment 72 which extends between the rotors 32 and the concave 56 but, more accurately, it may be said that said compartment extends between the inner surfaces of the concaves 56 and the orbital paths 60 of the rasp bars 34, the radical dimension of the latter compartment being relativly small and, for purposes of the present invention, being designated a threshing region which extends for the full length of the rasp bars 34 as viewed in FIGS. 1 and 2. The crop material to be shelled or threshed is delivered by the auger 70 which moves the material up the lower inclined plate 74 to the inlet end of the threshing compartment or region 72.

By reference to FIG. 1 and particularly to FIG. 2, it readily can be appreciated that under circumstances where dense masses and abnormal sizes of gobs or bunches, or rope like masses of said crop material are delivered at the upper end of the elevator 28 to the auger 70 and, from there, into the inlet end of the threshing compartment or region 72. Abnormal conditions will result and in combines of the type used presently and heretofore, such conditions result in abnormal consumption of power, undue wear in the components comprising the threshing compartment or region 72, as well as either damage occuring to certain of said components or, if the combine is designed and built to withstand such conditions without damage, said components must be of very heavy and strong construction, thereby adding to the cost thereof. In view of this, it is the principle purpose of the present invention to alleviate such conditions by providing modified construction comprising an improvement over present and prior combines that do not include such improvement, whereby the combine need not be provided with abnormal power drive means or unduly heavy construction, yet still be capable of accommodating such abnormal masses, bunches or rope-like configurations of crop material and effectively shell or thresh the same. Details of such modifications and improvements are as follows.

Referring particularly to FIGS. 2 and 3, it will be seen that the inlet end 76 of the threshing compartment or region 72 is provided with a relief space 78 which is best shown in FIG. 2. Said space preferably is formed by cutting away the upper edges, as viewed in FIG. 2, of the bars 80 which are parallel and extend longitudinally of the threshing compartment 72 in parallel relationship to the axis of the rotor 32. The lower edges of said bars are received in slots formed in a plurality of arcuate, transversely extending ribs 82, the opposite ends of which are suitably supported respectively by rail members 84 which extend longitudinally of the threshing compartment 72 and toggle members 86 which are supported by suitable transverse means, not shown, which extend between opposite sides of the main frame means 42 of the combine.

The upper surface 88 of the cutaway portions of the rails 80, at the inlet end thereof, which define the relief space 78 are parallel to the lower surfaces of the rails 80, whereby the cutaway portions are of uniform depth and of predetermined length, terminating at the inner ends thereof in upwardly and rearwardly sloping edges 90. Said sloping surfaces are shown in end view in FIG. 3. The provision of said relief space 78 as formed by said cutaway portion of the bars 80 results in a definite thinning of the abnormal bunches or rope-like mass of the crop material as it is moved substantially in an axial direction by the augers 70 for engagement by the rasp bars 34 which move radially, thereby abruptly shifting the direction of movement of said material which will occur in the relief space 78, whereby the rotary movement of the rasp bars 34 will effect such thinning of the abnormal masses of material prior to the oncoming material moving said thinned masses into the more confined threshing compartment 72 which is rearwardly of the relief space 78. Such thinning of the material results in substantial and marked improvement in the operation of combines of the type in which the present invention is incorporated by minimizing or eliminating the thumping caused by said masses of material in conventional combines not provided with said improvement. Of equal or greater importance is the minimizing of wear upon the rasp bars and concave bars of the threshing mechanism, minimizing the power consumption to operate the threshing mechanism and saving kernels or grain which is threshed at the inlet end of the threshing compartment from being damaged therein.

The cutaway end portions of the bars 80 adjacent the inlet end of the threshing compartment 72 have a plurality of wire-like elements 92 which are of substantial guage and extend transversely through similar openings formed in the cutaway end portions of said plate. As can be visualized from FIG. 2, the elements 92 are slightly spaced apart in a direction parallel to the axis of the rotors 32, whereby a grid-like pattern of openings is provided between the relieved ends of said bars 80 through which shelled or threshed product material passes for reception upon the grain pan 64 and is subsequently processed in the manner described hereinabove.

From FIG. 2, it will also be seen that additional wire-like elements 94 extend between the portions of the concave bars 80 which are not cutaway and thereby provide additional spaces through which shelled or threshed product material falls onto the grain pan 64.

Although the principal movement of the material being threshed within the threshing compartment 72 is in a radial direction, said material progressively is moved rearwardly, in an axial direction, by engaging the angular transport fins 96 which are somewhat spiral in configuration and are supported by the inner surface of the upper shields 58 as clearly shown in FIGS. 2 and 3.

If desired, auxiliary, or supplemental concave sections 98, which are shown in end view in FIG. 3, may be suitably supported to extend between one longitudinal edge of the principal concaves 56 and the lower edge of one side of the upper shields 58. If such auxiliary sections are employed, the forward ends of the bars 100 thereof are relieved on the inner edges to correspond to the upper surfaces 88 of bars 80. However, if desired, the transverse spacing of the bars 100 is less than the bars 80 of the principal concaves 56.

From the foregoing, it will be seen that the present invention provides simple but highly effective relief means at the inlet end of the threshing compartment of the combine where any abnormal masses, bunches or rope-like formations of crop material may be thinned or smoewhat smoothed out incident to having the direction of movement thereof abruptly changed from generally axial to substantially radial, prior to the material being introduced to the more confined major or principal threshing region of the threshing compartment 72, thus resulting in the benefits of savings in power consumption, minimal wear upon the components of the threshing elements as well as minimizing product damage, and otherwise resulting in improved threshing operations performed by the combine.

While the invention has been described and illustrated in its several preferred embodiments, it should be understood that the invention is not to be limited to the precise details herein illustrated and described since the same may be carried out in other ways falling within the scope of the invention as illustrated and described.

I claim:
1. In an axial flow combine provided with
a. a casing having an infeed end arranged to receive crop material in a substantially axial direction,
b. a rotor extending generally axially in said casing rearwardly from the infeed end thereof,
c. rasp bar means extending along said rotor at spaced locations thereon,
d. and a concave supported within said casing at least partially along the lower surface portion of said rotor for cooperation with said rasp bar means on said rotor to form a threshing region in which crop material is threshed therebetween in a substantially radial movement and said concave having an inlet end adjacent the infeed end of said casing; the improvement comprising in combination therewith:
e. a relief section in said inlet end of said concave and extending longitudinally thereof a predetermined distance inwardly from said inlet end and underlying the forward portions of said rasp bar means, thereby providing a thinning space adjacent the inlet end of said threshing region into which abnormally large masses of material may be accommodated in a generally axial direction and converted to radial movement prior to passing farther into said threshing region for primarily raidal movement therein and thereby minimize power requirements and wear upon the threshing components of the combine resulting also in minimizing customary thumping of the masses of material which normally occurs under similar conventional combine circumstances.

2. The combine according to claim 1 in which said concave comprises a series of similar bars circumferentially spaced around the axes of said rotor and extending radially relative to said axis, and said bars having wire-like members extending transversely between said bars and spaced apart predetermined distances longitudinally of said bars to provide spaces through which shelled and threshed agricultural products may be discharged, and said combine further including means beneath said concave to receive said shelled and threshed products, the edges of said bars nearest the axis of said rotor being cutaway along the portions of said edges nearest said inlet end of said concave to form said relief section of said concave.

3. The combine according to claim 2 in which the cutaway portion of each bar is of uniform length and depth and the inner ends thereof sloping upward to the upper edge of each of said bars to provide a smooth transition of material from said relief section of the concave to said threshing region rearward of said relief section thereof.

4. The combine according to claim 1 in which said rotor has an auger on the forward end thereof and said combine further including an elevator forwardly of said auger and extending upwardly and rearwardly thereto to deliver crop material to the lower portion of said auger for undershot delivery of crop material to the infeed end of said concave and rotor, and said concave being segmental and extending around the lower portion of said rotor at least one forth of the circumference of the lowermost portion thereof, whereby the location of said relief in the forward inlet end of said concave readily accommodates the undershot delivery of crop material thereto for initial thinning of said material prior to passage of the same rearwardly into said threshing region past said relief in said concave.

5. The combine according to claim 1 in which said relief section adjacent the inlet end of said threshing region extends a limited distance radially away from the axis of the rotor.

* * * * *